United States Patent
Rapp

(10) Patent No.: US 7,966,555 B2
(45) Date of Patent: Jun. 21, 2011

(54) CONTEXT SENSITIVE DELIMITER INSERTION WHEN ADDING REFERENCES

(75) Inventor: Peter William Rapp, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 953 days.

(21) Appl. No.: 11/890,654

(22) Filed: Aug. 6, 2007

(65) Prior Publication Data

US 2009/0044088 A1    Feb. 12, 2009

(51) Int. Cl.
*G06F 17/00*    (2006.01)
(52) U.S. Cl. ......... 715/212; 715/201; 715/661; 715/705
(58) Field of Classification Search ............... 715/212, 715/219, 220, 227
See application file for complete search history.

(56) References Cited

U.S. PATENT DOCUMENTS

| 5,987,481 | A  * | 11/1999 | Michelman et al. | 715/219 |
| 2002/0007372 | A1 * | 1/2002 | Bauchot et al. | 707/503 |
| 2006/0069696 | A1 * | 3/2006 | Becker et al. | 707/102 |
| 2006/0129932 | A1 * | 6/2006 | Weber et al. | 715/705 |
| 2006/0161844 | A1 * | 7/2006 | Simkhay et al. | 715/538 |

* cited by examiner

*Primary Examiner* — Doug Hutton
*Assistant Examiner* — Quoc A Tran
(74) *Attorney, Agent, or Firm* — Van Pelt, Yi & James LLP

(57) ABSTRACT

Context sensitive delimiter insertion when adding references is disclosed. In some embodiments, a plurality of indications of selections of a cell or cell range while in a formula editing mode in a host cell into which a formula is being entered is successively received, and in response to receiving each indication of selection of the plurality a reference to the selected cell or cell range is successively inserted into the formula, wherein the references inserted into the formula are delimited by a first delimiter type if in a first context and wherein the references inserted into the formula are delimited by a second delimiter type if in a second context.

13 Claims, 4 Drawing Sheets

|   | A | B | C | + |
|---|---|---|---|---|
| 1 | 4 | 0 | 5 |   |
| 2 | 7 | 2 | 6 |   |
| 3 | 8 | 3 | 9 |   |
| 4 |   | =A1+A3+C1:C3 |   |   |
| + |   |   |   |   |

|   | A | B | C | D |
|---|---|---|---|---|
| 1 | 4 | 0 | 5 | 6 |
| 2 | 7 | 2 | 2 | 8 |
| 3 |   |   |   | 3 |
| 4 |   | =A1,B2,D3 |   |   |
| 5 |   |   |   |   |
| 6 |   |   |   |   |
| 7 |   |   |   |   |
| 8 |   |   |   |   |

FIG. 1

(Prior Art)

| | A | B | C | |
|---|---|---|---|---|
| 1 | 4 | 0 | 5 | |
| 2 | 7 | 2 | 6 | |
| 3 | 8 | 3 | 9 | |
| 4 | | =A1+B2+C3 | | |
| | | | | |

FIG. 2A

| | A | B | C | |
|---|---|---|---|---|
| 1 | 4 | 0 | 5 | |
| 2 | 7 | 2 | 6 | |
| 3 | 8 | 3 | 9 | |
| 4 | | =A1+A3+C1:C3 | | |
| | | | | |

FIG. 2B

| | A | B | C | |
|---|---|---|---|---|
| 1 | 4 | 0 | 5 | |
| 2 | 7 | 2 | 6 | |
| 3 | 8 | 3 | 9 | |
| 4 | | =product(A1, B2, C3) | | |
| + | | | | |

FIG. 3A

| | A | B | C | |
|---|---|---|---|---|
| 1 | 4 | 0 | 5 | |
| 2 | 7 | 2 | 6 | |
| 3 | 8 | 3 | 9 | |
| 4 | | =product(A1, A3, C1:C3) | | |
| + | | | | |

FIG. 3B

CONTEXT SENSITIVE DELIMITER INSERTION WHEN ADDING REFERENCES

BACKGROUND OF THE INVENTION

In typical spreadsheet applications, references to one or more cells can be inserted into a formula being entered into a host cell. Clicking on a series of cells and/or ranges of cells while holding down the control (Ctrl) key of a keyboard results in the automatic insertion of references to the clicked cells and/or ranges of cells in the formula with the references delimited by commas as depicted in FIG. 1. In such cases, if other delimiters are desired in the formula between one or more of the inserted references, a user has to change the commas manually into the desired delimiters.

BRIEF DESCRIPTION OF THE DRAWINGS

Various embodiments of the invention are disclosed in the following detailed description and the accompanying drawings.

Figure 1:
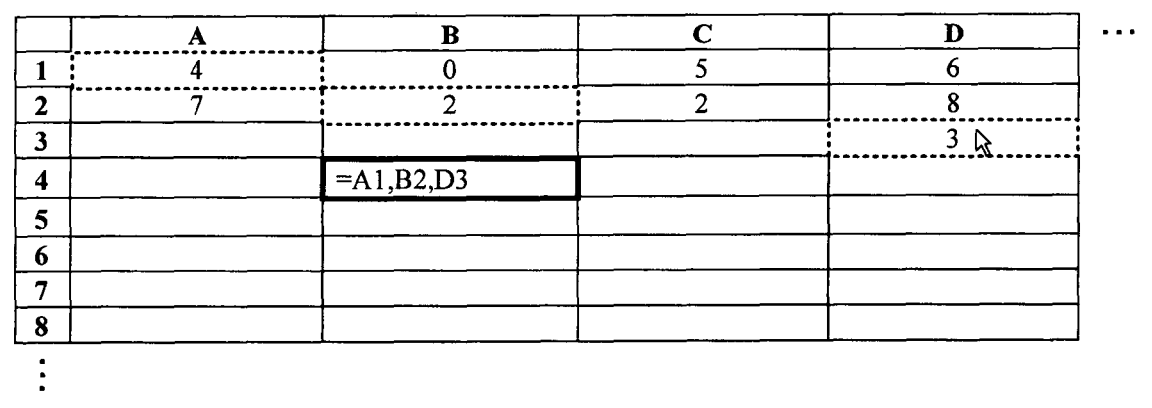

FIG. 1 illustrates an embodiment of inserting references into a formula.

FIG. 2A illustrates an embodiment in which references inserted into a formula are delimited by plus signs.

FIG. 2B illustrates an embodiment in which references inserted into a formula are delimited by plus signs.

FIG. 3A illustrates an embodiment in which references inserted into a formula are delimited by commas.

FIG. 3B illustrates an embodiment in which references inserted into a formula are delimited by commas.

DETAILED DESCRIPTION

Figure 4:
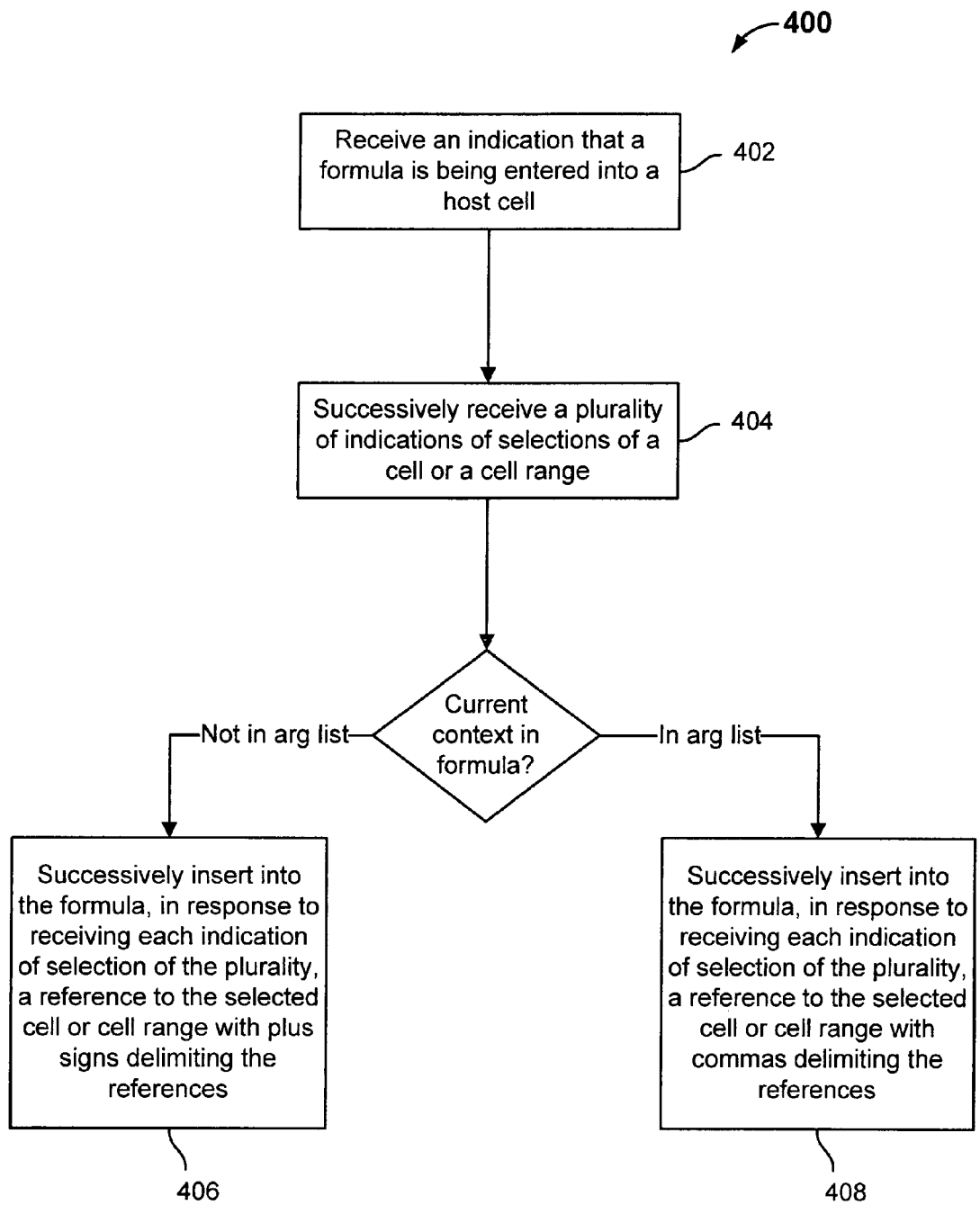
FIG. 4 illustrates an embodiment of a process for inserting context sensitive delimiters between references in a formula.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Context sensitive delimiter insertion when adding references is disclosed. In some embodiments, a plurality of indications of selections of a cell or cell range while in a formula editing mode in a host cell into which a formula is being entered is successively received, and in response to receiving each indication of selection of the plurality a reference to the selected cell or cell range is successively inserted into the formula, wherein the references inserted into the formula are delimited by a first delimiter type if in a first context and wherein the references inserted into the formula are delimited by a second delimiter type if in a second context.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet of a spreadsheet document may include a desired number of table objects. Although in many of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

References to one or more cells and/or ranges of cells can be included in a formula. While entering a formula into a host cell, references to one or more cells and/or cell ranges can be manually entered into the formula and/or can be automatically inserted into the formula by clicking on (e.g., using a mouse or other selection tool) or otherwise selecting the one or more cells and/or cell ranges while in the formula editing mode in the host cell. Multiple successive references are inserted into a formula in response to the successive selection of a series of cells and/or cell ranges. In some such cases, a prescribed keyboard key (e.g., the control key) needs to be simultaneously held down while selecting successive cells and/or cell ranges to insert multiple successive references to the selected cells and/or cell ranges into a formula. In some embodiments, as disclosed herein, the default delimiter type that is automatically inserted between references in a formula when multiple successive references are inserted into the formula in response to successive selections of a plurality of cells and/or cell ranges is based on the context of the formula. In some embodiments, references inserted into a formula that are not arguments of a function are delimited by plus signs, but references that are arguments of a function are delimited by commas.

FIGS. 2A, 2B, 3A, and 3B illustrate embodiments in which references inserted into a formula are delimited using a delimiter type based at least in part on the current context of the formula. FIGS. 2A and 2B illustrate embodiments in which references inserted into a formula are delimited by plus signs. In the given examples, the successive selection of multiple cells and/or cell ranges while not in an argument list of a function results in references to the selected cells and/or cell ranges that are delimited by plus signs to be inserted into the formula being entered into the host cell. Since in many cases it is likely that when a user successively selects a plurality of cells and/or cell ranges while not in an argument list of a function, the user desires to add the values of the selected cells, it is useful for the default delimiter between references when not in an argument list to be plus signs rather than commas so that the user does not have to go back and manually change commas to plus signs. References inserted into a formula in response to the successive selection of multiple cells and/or cell ranges while in an argument list of a function being entered into the formula, however, are delimited by commas. FIGS. 3A and 3B illustrate embodiments in which references inserted into a formula are delimited by commas.

FIG. 4 illustrates an embodiment of a process for inserting context sensitive delimiters between references in a formula. In some embodiments, process 400 is employed with respect to FIGS. 2A-B and 3A-B to insert references and delimiters wherein the type of delimiter inserted is based on the current context of a formula with respect to which the references are inserted. Process 400 starts at 402 at which an indication that a formula is being entered into a host cell is received. In some embodiments, the indication that a formula is being entered is received at 402 in response to an equals sign "=" being entered into the host cell. At 404, a plurality of indications of selections of a cell or cell range is successively received. If the current context of the formula being entered into the host cell does not comprise an argument list of a function, in response to receiving each indication of selection of a cell or cell range at 404, a reference to the selected cell or cell range is successively inserted into the formula at 406 with plus signs delimiting the references. If the current context of the formula being entered into the host cell comprises an argument list of a function being entered into the formula, in response to receiving each indication of selection of a cell or cell range at 404, a reference to the selected cell or cell range is successively inserted into the formula at 408 with commas delimiting the references.

Although in the given examples two contexts for inserting references into formulas are described with commas employed as the default delimiters for references inserted into an argument list of a function and plus signs employed as the default delimiters otherwise, in other embodiments, any number of contexts of formulas may be defined and/or any appropriate default delimiter type may be selected for each context. In some embodiments, a user is provided with options to define one or more contexts of formulas and/or select the default delimiter types for one or more contexts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for inserting context sensitive delimiters into a formula, comprising:
   successively receiving a plurality of selections of a cell or cell range while in a formula editing mode in a host cell into which a formula is being entered;
   automatically determining a current context of the formula with respect to which the selections are received; and
   automatically inserting a first delimiter type between references inserted into the formula in response to receiving the plurality of selections when the current context comprises a first context and inserting a second delimiter type between references inserted into the formula in response to receiving the plurality of selections when the current context comprises a second context;
   wherein the delimiter type automatically inserted between references inserted into the formula is based on the current context of the formula with respect to which the references are inserted; and
   wherein the first context is not being in an argument list of a function and the first delimiter type is a plus sign; and
   wherein the second context is being in an argument list of a function and the second delimiter type is a comma.

2. A method as recited in claim 1, further comprising receiving an indication that a prescribed keyboard key associated with successively selecting a plurality of cells is selected.

3. A method as recited in claim 2, wherein the prescribed keyboard key comprises a control key.

4. A method as recited in claim 1, further comprising receiving an indication that a formula is being entered into the host cell.

5. A method as recited in claim 4, wherein receiving an indication that a formula is being entered into the host cell comprises receiving an indication that an equals sign has been entered into the host cell.

6. A method as recited in claim 1, wherein the first context and the second context are included in a set of contexts of formulas and wherein each context in the set is associated with a default delimiter type.

7. A method as recited in claim 1, further comprising providing options to specify one or more of the first delimiter type, the second delimiter type, the first context, and the second context.

8. A method as recited in claim 1, wherein an indication of a selection of a cell or cell range of the plurality is received in response to the cell or cell range being clicked on or otherwise selected using a selection tool.

9. A method as recited in claim 1, wherein the host cell and the selected cell or cell range associated with each of the plurality are associated with at least standard spreadsheet functionality.

10. A system for inserting context sensitive delimiters into a formula, comprising:
    a processor configured to:
      successively receive a plurality of selections of a cell or cell range while in a formula editing mode in a host cell into which a formula is being entered;
      automatically determine a current context of the formula with respect to which the selections are received; and
      automatically insert a first delimiter type between references inserted into the formula in response to receiving the plurality of selections when the current context comprises a first context and insert a second delimiter type between references inserted into the formula in response to receiving the plurality of selections when the current context comprises a second context;
      wherein the delimiter type automatically inserted between references inserted into the formula is based on the current context of the formula with respect to which the references are inserted; and
      wherein the first context is not being in an argument list of a function and the first delimiter type is a plus sign; and
      wherein the second context is being in an argument list of a function and the second delimiter type is a comma; and a memory coupled to the processor and configured to provide instructions to the processor.

11. A computer program product for inserting context sensitive delimiters into a formula, the computer program product being embodied in a non-transitory computer readable medium and comprising computer instructions for:
successively receiving a plurality of selections of a cell or cell range while in a formula editing mode in a host cell into which a formula is being entered;
automatically determining a current context of the formula with respect to which the selections are received; and
automatically inserting a first delimiter type between references inserted into the formula in response to receiving the plurality of selections when the current context comprises a first context and inserting a second delimiter type between references inserted into the formula in response to receiving the plurality of selections when the current context comprises a second context;
wherein the delimiter type automatically inserted between references inserted into the formula is based on the current context of the formula with respect to which the references are inserted; and
wherein the first context is not being in an argument list of a function and the first delimiter type is a plus sign; and
wherein the second context is being in an argument list of a function and the second delimiter type is a comma.

12. A computer program product as recited in claim 11, the computer program product further comprising instructions for providing options to specify one or more of the first delimiter type, the second delimiter type, the first context, and the second context.

13. A computer program product as recited in claim 11, wherein the first context and the second context are included in a set of contexts of formulas and wherein each context in the set is associated with a default delimiter type.

* * * * *